United States Patent
Sur et al.

(10) Patent No.: US 9,442,773 B2
(45) Date of Patent: *Sep. 13, 2016

(54) THERMALLY DRIVEN WORKLOAD SCHEDULING IN A HETEROGENEOUS MULTI-PROCESSOR SYSTEM ON A CHIP

(75) Inventors: Sumit Sur, Boulder, CO (US); James M. Artmeier, Boulder, CO (US); Mark D. Guzzi, Boulder, CO (US); Philip T. Mueller, Jr., Boulder, CO (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

This patent is subject to a terminal disclaimer.

(21) Appl. No.: 13/357,777

(22) Filed: Jan. 25, 2012

(65) Prior Publication Data
US 2013/0132972 A1    May 23, 2013

Related U.S. Application Data

(60) Provisional application No. 61/562,234, filed on Nov. 21, 2011.

(51) Int. Cl.
   G06F 9/46      (2006.01)
   G06F 9/455     (2006.01)
   G06F 9/50      (2006.01)
   (Continued)

(52) U.S. Cl.
   CPC ............ *G06F 9/5094* (2013.01); *G06F 1/206* (2013.01); *G06F 1/329* (2013.01); *G06F 1/3293* (2013.01); *G06F 11/3058* (2013.01); *G06F 11/3433* (2013.01); *Y02B 60/121* (2013.01);
   (Continued)

(58) Field of Classification Search
   None
   See application file for complete search history.

(56) References Cited

U.S. PATENT DOCUMENTS

| | | | |
|---|---|---|---|
| 7,373,269 | B2 | 5/2008 | Furuichi et al. |
| 9,043,795 | B2 | 5/2015 | Morrow et al. |

(Continued)

FOREIGN PATENT DOCUMENTS

| | | |
|---|---|---|
| JP | H0876874 A | 3/1996 |
| JP | 2006099624 A | 4/2006 |

(Continued)

OTHER PUBLICATIONS

International Search Report and Written Opinion—PCT/US2012/062582—ISA/EPO—Feb. 20, 2013.

(Continued)

*Primary Examiner* — Abdullah Al Kawsar
*Assistant Examiner* — Bradley Teets
(74) *Attorney, Agent, or Firm* — Nicholas A. Cole

(57) ABSTRACT

Various embodiments of methods and systems for thermally aware scheduling of workloads in a portable computing device that contains a heterogeneous, multi-processor system on a chip ("SoC") are disclosed. Because individual processing components in a heterogeneous, multi-processor SoC may exhibit different processing efficiencies at a given temperature, and because more than one of the processing components may be capable of processing a given block of code, thermally aware workload scheduling techniques that compare performance curves of the individual processing components at their measured operating temperatures can be leveraged to optimize quality of service ("QoS") by allocating workloads in real time, or near real time, to the processing components best positioned to efficiently process the block of code.

24 Claims, 10 Drawing Sheets

(51) Int. Cl.
*G06F 1/20* (2006.01)
*G06F 1/32* (2006.01)
*G06F 11/30* (2006.01)
*G06F 11/34* (2006.01)

(52) U.S. Cl.
CPC ........... *Y02B60/1275* (2013.01); *Y02B 60/142* (2013.01); *Y02B 60/144* (2013.01); *Y02B 60/165* (2013.01)

(56) References Cited

U.S. PATENT DOCUMENTS

| | | |
|---|---|---|
| 2004/0168097 A1 | 8/2004 | Cook et al. |
| 2005/0086029 A1 | 4/2005 | Cascaval et al. |
| 2006/0070074 A1 | 3/2006 | Maeda et al. |
| 2006/0095911 A1 | 5/2006 | Uemura et al. |
| 2006/0095913 A1 | 5/2006 | Bodas et al. |
| 2007/0124618 A1 | 5/2007 | Aguilar, Jr. et al. |
| 2008/0022076 A1 | 1/2008 | Krieger et al. |
| 2009/0007120 A1 | 1/2009 | Fenger et al. |
| 2009/0100437 A1* | 4/2009 | Coskun et al. ............... 718/105 |
| 2009/0150893 A1 | 6/2009 | Johnson et al. |
| 2009/0254909 A1* | 10/2009 | Hanson ................. G06F 1/3203 718/102 |
| 2011/0078469 A1 | 3/2011 | Therien |
| 2011/0138395 A1 | 6/2011 | Wolfe |
| 2012/0005683 A1* | 1/2012 | Bower, III ............ G06F 9/5094 718/103 |
| 2012/0272086 A1* | 10/2012 | Anderson et al. ............. 713/340 |
| 2013/0073875 A1* | 3/2013 | Anderson et al. ............. 713/300 |
| 2013/0246820 A1* | 9/2013 | Branover et al. ............. 713/320 |
| 2014/0189710 A1 | 7/2014 | Sur et al. |

FOREIGN PATENT DOCUMENTS

| | | |
|---|---|---|
| JP | 2006133995 A | 5/2006 |
| JP | 2008165815 A | 7/2008 |
| WO | 03083693 A1 | 10/2003 |
| WO | WO-2010068855 A2 | 6/2010 |

OTHER PUBLICATIONS

Kumar R., et al.,"Single-ISA heterogeneous multi-core architectures: the potential for processor power reduction", Microarchitecture, 2003. MICRO-36. Proceedings. 36th Annual IEEE/ACM International Symposium on Dec. 3-5, 2003, Piscataway, NJ, USA.IEEE, Dec. 3, 2003, pp. 81-92, XP010674229, DOI: 10.1109/MICRO.2003.1253185 ISBN: 978-0-7695-2043-8.

* cited by examiner

THERMALLY DRIVEN WORKLOAD SCHEDULING IN A HETEROGENEOUS MULTI-PROCESSOR SYSTEM ON A CHIP

CROSS-REFERENCE TO RELATED APPLICATIONS

Priority under 35 U.S.C. §119(e) is claimed to the U.S. provisional application entitled "THERMALLY DRIVEN WORKLOAD SCHEDULING IN A HETEROGENEOUS MULTI-PROCESSOR SYSTEM ON A CHIP," filed on Nov. 21, 2011 and assigned application Ser. No. 61/562,234, the entire contents of which are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palm-top computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. When two or more heat producing components are suitably spaced from one another within a PCD, heat generated from the operation of each component may not negatively impact the operation of the other. Moreover, when a heat producing component within a PCD is physically isolated from other components within the device, the heat generated from the operation of the heat producing component may not negatively impact other surrounding electronics. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there just typically isn't enough space within a PCD for engineers and designers to mitigate thermal degradation or failure through the leveraging of spatial arrangements or placement of passive cooling components. Consequently, thermal energy generation is often managed in a PCD through the application of various thermal management techniques that may include wilting or shutting down electronics at the expense of performance.

Thermal management techniques are employed within a PCD in an effort to seek a balance between mitigating thermal energy generation and impacting the quality of service ("QoS") provided by the PCD. In a PCD that has heterogeneous processing components, the ramifications of balancing that tradeoff can be difficult to manage because the various processing components within the PCD are not created equal. For instance, there may be multiple processing components in a PCD capable of processing a given block of code and, depending on the respective operating temperatures of those components, one will be more efficient at processing that block of code than another. Consequently, as workload tasks are completed and thermal mitigation measures are applied, the specific processor that is best positioned to process a block of code may vary from moment to moment according to the individual operating temperatures of the various processors.

Accordingly, what is needed in the art is a method and system for scheduling or allocating workload in a PCD across heterogeneous processing components based on real time, or near real time, comparative analysis of processor performance curves.

SUMMARY OF THE DISCLOSURE

Various embodiments of methods and systems for thermally aware scheduling of workloads in a portable computing device that contains a heterogeneous, multi-processor system on a chip ("SoC") are disclosed. Because individual processing components in a heterogeneous, multi-processor SoC may exhibit different processing efficiencies at a given temperature, and because more than one of the processing components may be capable of processing a given block of code, thermally aware workload scheduling techniques that compare performance curves of the individual processing components at their measured operating temperatures can be leveraged to optimize quality of service ("QoS") by allocating workloads in real time, or near real time, to the processing components best positioned to efficiently process the block of code.

One such method involves monitoring temperature readings uniquely associated with each of a plurality of individual processing components in a heterogeneous, multi-processor SoC. When it becomes necessary to schedule a block of code for processing, two or more of the plurality of processing components that are eligible to process the block of code are identified. The temperature readings associated with each of the identified processing components are taken and used to query a database of temperature related performance curves associated with the processing components. The performance curves represent the relationship between power consumption and workload processing capability for a given individual processing component when that processing component is operating at a given temperature. The queried performance curves are compared and, based on the comparison, the most efficient processing component available for processing the block of code is selected. The block of code is allocated to the selected processing component.

Some embodiments of the method select the most efficient processing component by mapping the current workloads of the processing components to the queried performance curves associated with each. Other embodiments add the workload burden represented by the block of code to the present workload burden of the individual processing components and then map the future workloads to the queried performance curves associated with each. Still other embodiments predict a likely temperature rise that may result from the allocation of the block of code to each of the eligible processing components and then, based on the predicted temperature, query performance curves for each processing component.

Advantageously, embodiments of the system and method optimize QoS by selecting the best available processing component in real time, or near real time, as blocks of code arrive from a scheduling queue for processing. In this way, workload burdens may be assigned to the processing components that are best positioned to efficiently process the workloads. Notably, as one of ordinary skill in the art will recognize, systems and methods for thermally aware scheduling of workloads may schedule similar or identical blocks of code to different processing components as the operating temperatures associated with the various processing components vary with time. That is, a certain processing component that is best positioned for efficiently processing a given block of code at one point in time may not be the best positioned processing component for processing an identical block of code at a later point in time.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
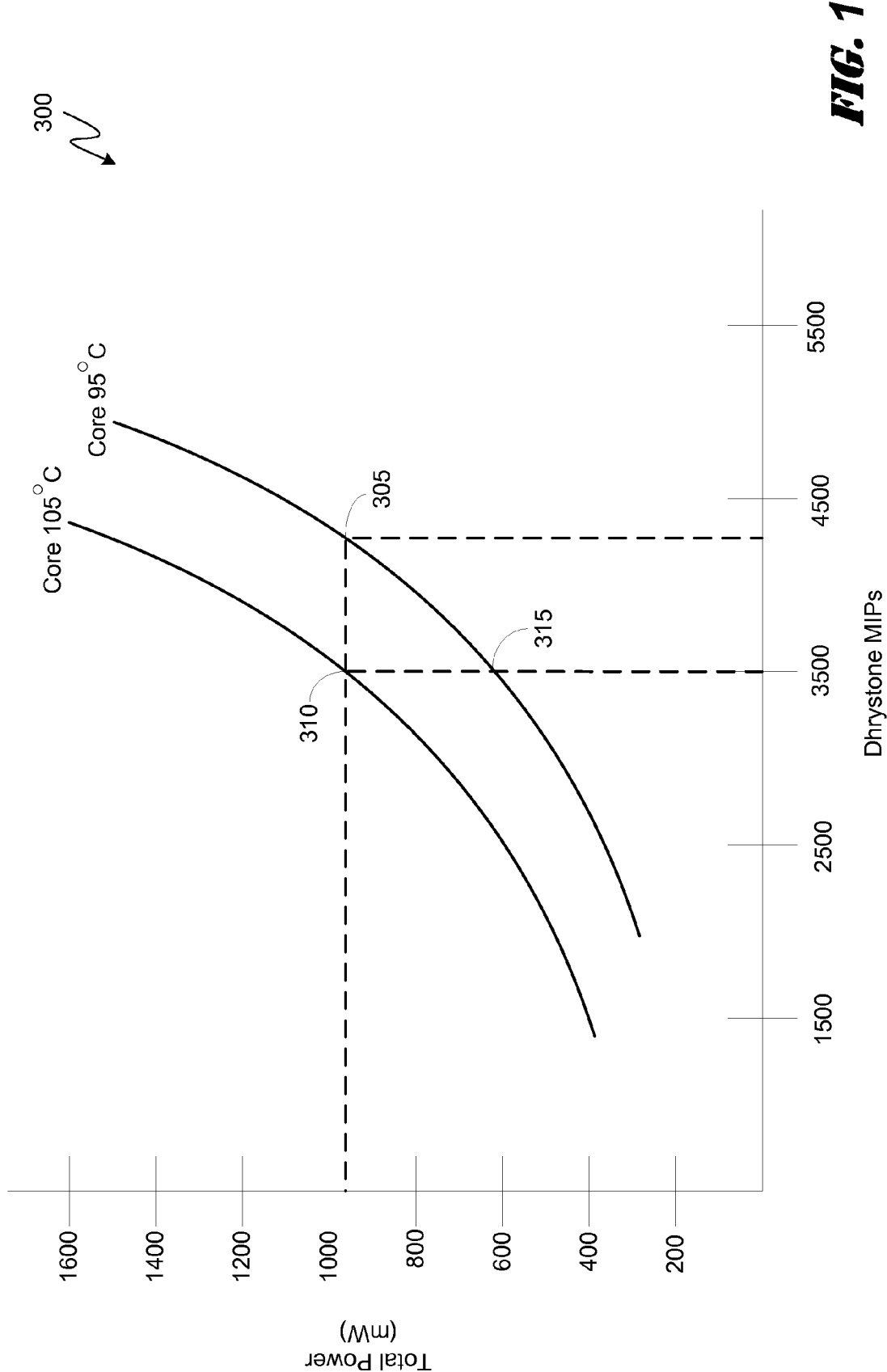
FIG. 1 is a graph illustrating a pair of performance curves of an exemplary processing component operating under different thermal conditions.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "processing engine" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are non-limiting examples of processing components that may reside in a PCD and are used interchangeably except when otherwise indicated. Moreover, as distinguished in this description, a CPU, DSP, or a chip may be comprised of one or more distinct processing components generally referred to herein as "core(s)" and "sub-core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," "process workload" and "block of code" are used interchangeably and generally directed toward the processing burden, or percentage of processing burden, that is associated with, or may be assigned to, a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management" and "thermal mitigation measure(s)" are used interchangeably.

One of ordinary skill in the art will recognize that the term "DMIPS" represents the number of Dhrystone iterations required to process a given number of millions of instructions per second. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing processing performance for QoS optimization in a PCD that has a heterogeneous processing component(s) can be accomplished by leveraging the diverse performance characteristics of the individual processing engines that are available for workload allocation. With regards to the diverse performance characteristics of various processing engines that may be included in a heterogeneous processing component, one of ordinary skill in the art will recognize that performance differences may be attributable to any number of reasons including, but not limited to, differing levels of silicon, design variations, etc. Moreover, one of ordinary skill in the art will recognize that the performance characteristics associated with any given processing component may vary in relation with the operating temperature of that processing component, the power supplied to that processing component, etc.

For instance, consider an exemplary heterogeneous multi-core processor which may include a number of different processing cores generally ranging in performance capacities from low to high (notably, one of ordinary skill in the art will recognize that an exemplary heterogeneous multi-processor system on a chip ("SoC") which may include a number of different processing components, each containing one or more cores, may also be considered). As would be understood by one of ordinary skill in the art, a low performance to medium performance processing core within the heterogeneous processor will exhibit a lower power leakage rate at a given workload capacity, and consequently a lower rate of thermal energy generation, than a processing core having a relatively high performance capacity. The higher capacity core may be capable of processing a given number of DMIPs in a shorter amount of time than a lower capacity core. Similarly, a high capacity core with a processing speed that has been wilted may exhibit a lower power leakage rate at a given workload capacity, and consequently a lower rate of thermal energy generation, than when processing at its full, unchecked capacity.

Even so, depending on the thermal conditions under which the cores may be operating, the lower performance core may be more, or less, efficient (in power consumption) at processing the given number of DMIPs than a high performance core. As such, by considering the individual performance curves of the diverse cores within the heterogeneous processor, where the performance curves indicate the power consumed by a given core at a given operating temperature in order to process a given number of DMIPs, a thermally aware scheduling algorithm can be leveraged to allocate workloads to a processing core which offers the best efficiency. Similarly, and also based on the individual performance curves of the diverse cores within the heterogeneous processor, a thermally aware scheduling algorithm can be leveraged to allocate workloads such that the power density across the entire processing component is optimized even though the processing efficiencies associated with individual cores may not be optimized.

As a non-limiting example, a particular block of code may be processed by either of a central processing unit ("CPU") or a graphical processing unit ("GPU") within an exemplary PCD. Advantageously, instead of predetermining that the particular block of code will be processed by one of the CPU or GPU, an exemplary embodiment may select which of the processing components will be assigned the task of processing the block of code as the need for processing the code ripens. That is, a "snap shot" of the performance curves of the CPU and GPU may be compared so that the processor best equipped to efficiently process the block of code is assigned the workload. Notably, it will be understood that subsequent processor selections for allocation of subsequent workloads may be made in real time, or near real time, as the blocks of code exit a scheduling queue. In this way, a thermally aware scheduling module may leverage operating temperatures associated with individual cores in a heterogeneous processor to optimize QoS by selecting processing cores just prior to workload allocation.

FIG. 1 is a graph 300 illustrating a pair of performance curves (Core 105° C., Core 95° C.) of an exemplary processing component operating under different thermal conditions. The processing component may be a core within a heterogeneous multi-core processor and may be a high capacity, medium capacity or low capacity core. More specifically, as one of ordinary skill in the art will acknowledge, the processing component may be any processing engine capable of processing a given block of code including, but not limited to, a CPU, GPU, DSP, programmable array, etc. Moreover, as described above, the exemplary processing engine may be a core or sub-core within a CPU, GPU, etc.

As can be seen from the FIG. 1 illustration, at a workload of 3500 DMIPs the exemplary core operating in a 95° C. environment consumes approximately 620 mW of power (point 315) but, at the same 3500 DMIP workload, the power consumption of the core increases to almost 1000 mW of power (point 310) when the operating environment reaches 105° C. Similarly, for a given operating temperature, the processing efficiency of a core decreases with an increase in workload. Referring to the Core 95° C. curve, for example, when the workload is increased from 3500 DMIPs to approximately 4300 DMIPs, the power consumption increases to almost 1000 mW (point 305).

It can be seen from the FIG. 1 illustration that, for a given processing component, the efficiency of the processing component in terms of power consumption decreases as the operating temperature rises. Notably, one of ordinary skill in the art will recognize that a rise in operating temperature of an exemplary processing component may be caused by any number of factors or combination of factors including, but not limited to, increased power leakage within the processing component associated with higher clocking speeds, thermal aggressors adjacent to the processing component, malfunctioning components adjacent to the processing component, etc. Moreover, one of ordinary skill in the art will recognize that increased workloads on a processing component may cause the operating temperature associated with the processing component at the time of workload allocation to rise as a result of an increased power leakage rate associated with an increase in power consumption. Regardless of why the operating temperature of a processing component may rise or fall, it is important to note from the FIG. 1 illustration that, in general, the processing efficiency of a given processing component decreases inversely with an increase in operating temperature.

Figure 2:
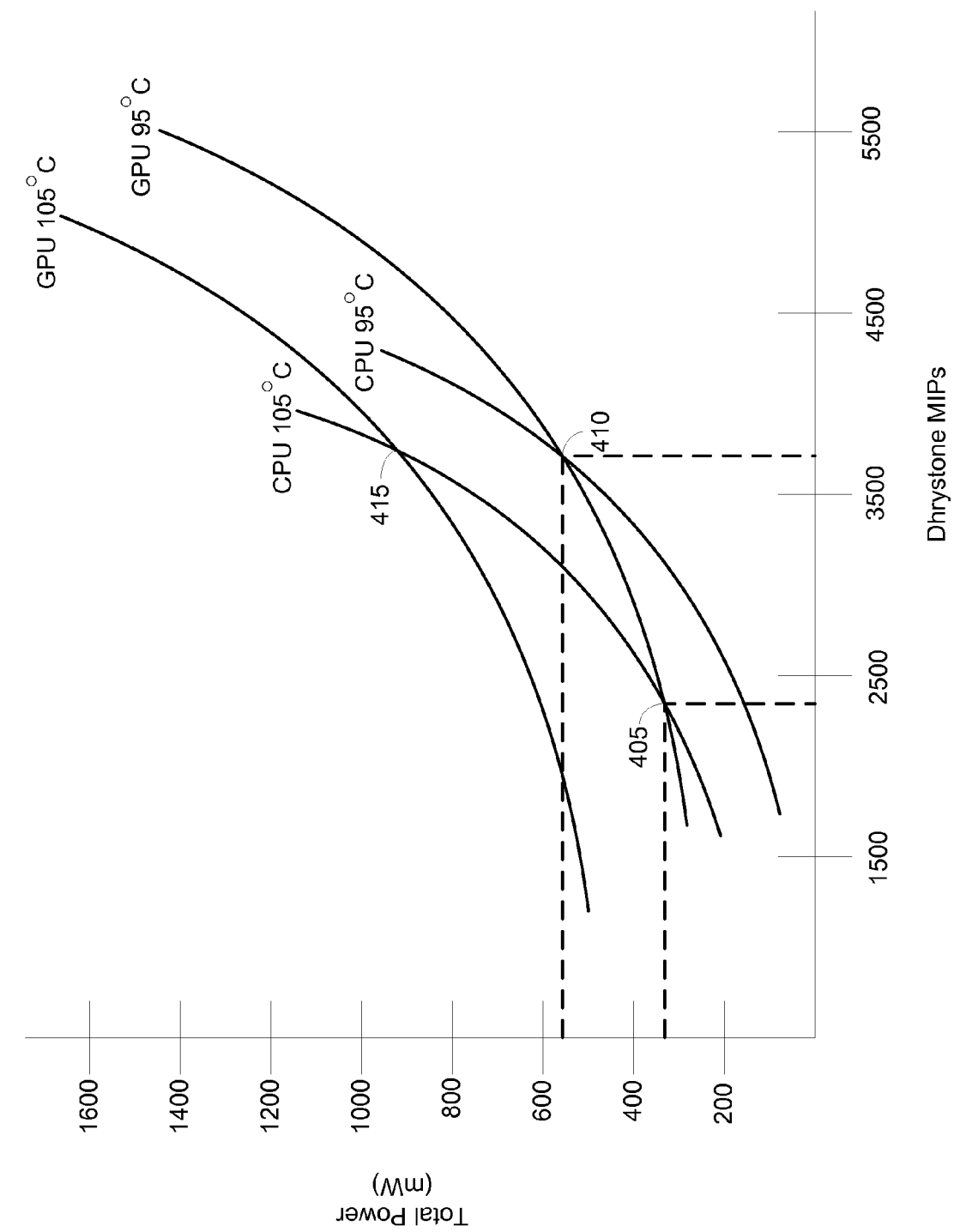
FIG. 2 is a graph illustrating a pair of performance curves for each of two exemplary processing components, a "low performance" central processing unit ("CPU") processing component and a "high performance" graphical processing unit ("GPU") processing component, operating under different thermal conditions.

Turning now to FIG. 2, a graph 400 illustrating a pair of performance curves (GPU 105° C., GPU 95° C.; CPU 105° C., CPU 95° C.) for each of two exemplary processing components, a "low performance" CPU processing component and a "high performance" GPU processing component, operating under different thermal conditions is depicted. Essentially, the FIG. 2 graph 400 depicts performance curves for two diverse exemplary processing components, each of which may be represented by the FIG. 1 illustration. Moreover, one of ordinary skill in the art will recognize that the two exemplary processors GPU, CPU represented by the performance curve pairs in FIG. 2 may be contained in a common heterogeneous multi-processor system on a chip ("SoC").

Notably, by overlaying the performance curves of the exemplary engines GPU, CPU, it can be seen that various transitions or cross-over points 405, 410, 415 are defined at the intersections of the various curves. These crossover points represent potential thresholds that can be leveraged by a thermally aware scheduling module to select processing components best positioned to efficiently process a given block of code.

For instance, a comparative analysis of the exemplary GPU, CPU processor performance curves, when each of the processors GPU, CPU are operating at 95°, can determine that both processors GPU, CPU are substantially equivalent in processing efficiency at a workload of approximately 3700 DMIPs (point 410). It can also be seen from the comparative analysis, however, that the CPU processing component is more efficient below point 410, i.e. the CPU processing component consumes less power per DMIP of workload when the workload is less than 3700 DMIPs. Conversely, the GPU core is more efficient above point 410, i.e. the GPU core consumes less power per DMIP of workload when the workload exceeds 3700 DMIPs.

Therefore, relying on the exemplary comparative analysis outlined above relative to point 410 of graph 400, a thermally aware scheduling module that leverages the comparative analysis of the exemplary GPU, CPU performance curves at a given operating temperature of 95° C. may dictate that a workload exceeding 3700 DMIPs should be scheduled to the GPU processing component. Similarly, the same thermally aware scheduling component may dictate that a workload less than 3700 DMIPs be scheduled to the CPU processing component.

In graph 400, the transition point 415 between the same two exemplary processing component GPU, CPU when the operating temperature is on the order of 105° C. may trigger processing component selection consistent with the logic outlined above relative to point 410. That is, a comparative analysis of the performance curves (GPU 105° C., CPU 105° C.) may be leveraged by a thermally aware scheduling module to schedule workloads such that the GPU processing component is biased to receive blocks of code when the required DMIPs is above the transition point 415 and the CPU processing component is biased to receive blocks of code when the required DMIPs is below the transition point 415.

Moreover, it will be understood that, due to any number of factors, diverse processors and/or cores in a heterogeneous multi-processor SoC may be operating under different thermal conditions. For example, in the FIG. 2 illustration, a transition point 405 represents the intersection of performance curves for the exemplary CPU processing component operating at 105° C. and the exemplary GPU processing component operating at 95° C. Consequently, by recognizing that the exemplary processors are operating at differing temperatures, an embodiment may leverage a comparative analysis to determine which of the processors is best equipped just prior to workload allocation to efficiently process a given block of code ready for processing, similar to the exemplary scenarios described above. For instance, workloads below 2400 DMIPs may be assigned to the CPU processing component, and workloads above 2400 DMIPs assigned to the GPU processing component, in order to ensure that workloads are processed under the most efficient conditions.

One of ordinary skill in the art will recognize that the various scenarios for workload scheduling outlined above do not represent an exhaustive number of scenarios in which a comparative analysis of processing component performance curves may be beneficial for workload scheduling in a heterogeneous multi-core processor and/or a heterogeneous multi-processor SoC. As such, it will be understood that any thermally aware scheduling component or module that is operable to compare the performance curves of two or more processing cores in a heterogeneous multi-core processor or heterogeneous multi-processor SoC, as the case may be, to determine a workload allocation is envisioned. A comparative analysis of processing component performance curves according to various embodiments can be used to schedule workloads among a plurality of processing components based on the identification of the most efficient processing component available at the time of workload allocation.

Notably, it is envisioned that certain embodiments of a thermally aware scheduling algorithm may be executed by a thermally aware scheduling module to compare performance curves of one or more eligible processing components based on the aggregate workload that the individual processing components may experience in the event that a next block of code is assigned. For instance, referring back to the exemplary curves GPU 95° C. and CPU 105° C. of the FIG. 2 illustration, suppose that each of the processors GPU, CPU associated with the curves are currently processing at a rate of 2000 DMIPs and a thermally aware scheduling module is seeking to determine which of the two exemplary processors is best positioned for efficient processing of an additional workload of 1000 DMIPs. A thermally aware scheduling algorithm may be used to compare the curves based on an assumed aggregate workload of 3000 DMIPs per processing component GPU, CPU (2000 DMIPs previously allocated per engine plus the additional 1000 DMIPs to be allocated to one of the engines), as opposed to the 2000 DMIPs workload currently being processed. For this non-limiting example, based on the exemplary curves GPU 95° C. and CPU 105° C. of the FIG. 2 illustration, the thermally aware scheduling module may select the more efficient GPU which will consume under 400 mW of power to process at 3000 DMIPs as opposed to the CPU which will consume over 500 mW of power at the same workload.

Still other embodiments of a thermally aware scheduling algorithm may be used to compare performance curves based on a predicted shift in the curves should an additional workload be assigned. For instance, referring back to the example of processors GPU and CPU processing at a rate of 2000 DMIPs each at operating temperatures of 95° C. and 105° C., respectively, embodiments of a thermally aware scheduling module may predict a shift in the performance curves that could result from the additional 1000 DMIP workload being allocated. Notably, because the additional 1000 DMIP workload may cause a processing component to which it is assigned to consume more power, a thermally aware scheduling module may consider that the operating temperature presently associated with the processing component will rise as a result of the additional workload and, as such, seek to compare performance curves associated with the predicted temperature rise.

Returning to the example, the additional 1000 DMIPs of workload may cause the operating temperature of the GPU to increase from 95° C. to 100° C. and, similarly, the operating temperature of the CPU to increase from 105° C. to 110° C. Accordingly, an embodiment of a thermally aware scheduling module may query and compare performance curves associated with the cores GPU and CPU operating at the predicted temperatures of 100° and 110°, respectively (GPU 100° C. and CPU 110° C. performance curves not shown in FIG. 2).

Figure 3:
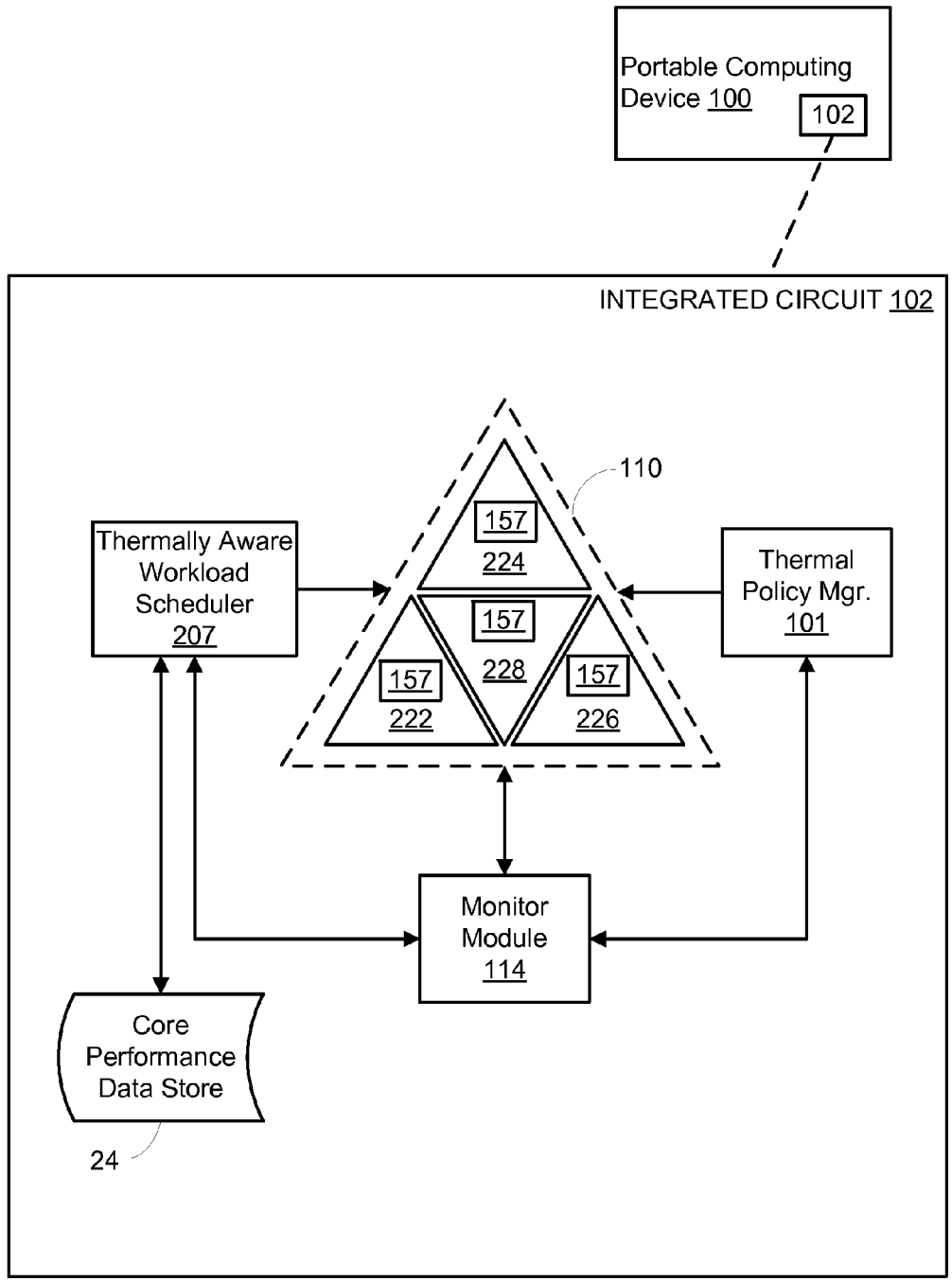
FIG. 3 is a functional block diagram illustrating an embodiment of an on-chip system for optimizing quality of service ("QoS") in a portable computing device ("PCD") through thermally aware workload scheduling across a heterogeneous, multi-processor system on a chip ("SoC")

FIG. 3 is a functional block diagram illustrating an embodiment of an on-chip system 102 for QoS optimization in a PCD 100 through thermally aware workload scheduling across a heterogeneous, multi-core processing component(s) 110. As explained above relative to the FIGS. 1 and 2 illustrations, the workload allocation across the processing components may be based on a comparative analysis of performance curves uniquely associated with the individual cores or processors 222, 224, 226, 228. Notably, as one of ordinary skill in the art will recognize, the processing component(s) 110 is depicted as a group of heterogeneous processing engines for illustrative purposes only and may represent a single processing component having multiple, heterogeneous cores 222, 224, 226, 228 or multiple, heterogeneous processors 222, 224, 226, 228, each of which may or may not comprise multiple cores and/or sub-cores. As such, the reference to processing engines 222, 224, 226 and 228 herein as "cores" will be understood as exemplary in nature and will not limit the scope of the disclosure.

The on-chip system may monitor temperature sensors 157 which are individually associated with cores 222, 224, 226, 228 with a monitor module 114 which is in communication with a thermal policy manager ("TPM") module 101 and a thermally aware workload scheduling ("TAWS") module 207. The TPM module 101 may receive temperature measurements from the monitor module 114 and use the measurements to determine and apply thermal management policies. The thermal management policies applied by the TPM module 101 may manage thermal energy generation by reallocation of workloads from one processing component to another, wilting or variation of processor clock speeds, etc. Notably, through application of thermal management policies, the TPM module 101 may reduce or alleviate excessive generation of thermal energy at the cost of QoS.

As one of ordinary skill in the art will recognize, thermal management policies dictated by the TPM module 101 may directly affect the operating temperature of one or more of the processing cores 222, 224, 226, 228. That is, thermal management techniques applied by the TPM module 101 may cause the operating temperature of one processing engine to decrease at the expense of the operating temperature of another processing engine which is called upon to carry an increased workload burden. Accordingly, as the operating temperatures of the various processing cores 222, 224, 226, 228 fluctuate, whether such fluctuation be attributable to applied thermal management policies, external thermal energy sources, etc., so do the performance curves associated those engines 222, 224, 226, 228.

As the operating temperatures associated with each of the cores 222, 224, 226, 228 change, the monitor module 114 recognizes the change and transmits temperature data indicating the change to both the TPM module 101 and the TAWS module 207. As explained above, the change in measured operating temperatures may trigger the TPM module 101 to adjust or apply various thermal management policies. The same temperature data, however, may trigger the TAWS module 207 to reference a core performance ("CP") data store 24 to query performance curves for one or more of the cores 222, 224, 226, 228 based on the measured operating temperatures. Subsequently, the TAWS module 207 may compare the identified performance curves in order to select the core 222, 224, 226, 228 best positioned at the time of comparison to efficiently process a given block of code, similar to that which is depicted and described in the above Figures.

An exemplary TAWS module 207 is configured to leverage a comparative analysis of one or more performance curves associated with the various, diverse processing components 222, 224, 226, 228. The TAWS module 207 may consider transition points represented by the intersection of compared performance curves to determine optimal workload ranges for each of the cores and assign blocks of code in such a manner that one or more of the cores 222, 224, 226, 228 continually operates in its optimal range. Advantageously, by using the temperature readings received from the monitor module 114 to query performance curves from the CP data store 24, the TAWS module 207 may optimize QoS by assigning workloads in real time, or near real time, to the particular processing engines in the best conditions to efficiently process the workloads.

Notably, one of ordinary skill in the art will recognize that, as the operating temperatures of the processing components 222, 224, 226, 228 change, the performance curves queried and compared by the TAWS module 207 will also change. As such, at different times the TAWS module 207 may select different processing engines 222, 224, 226, 228 for allocation of repetitive or similar blocks of code. In this way, it is an advantage of certain embodiments that a TAWS module 207 ensures workload assignments are allocated to the most efficient processing components available at the time of allocation.

Figure 4:
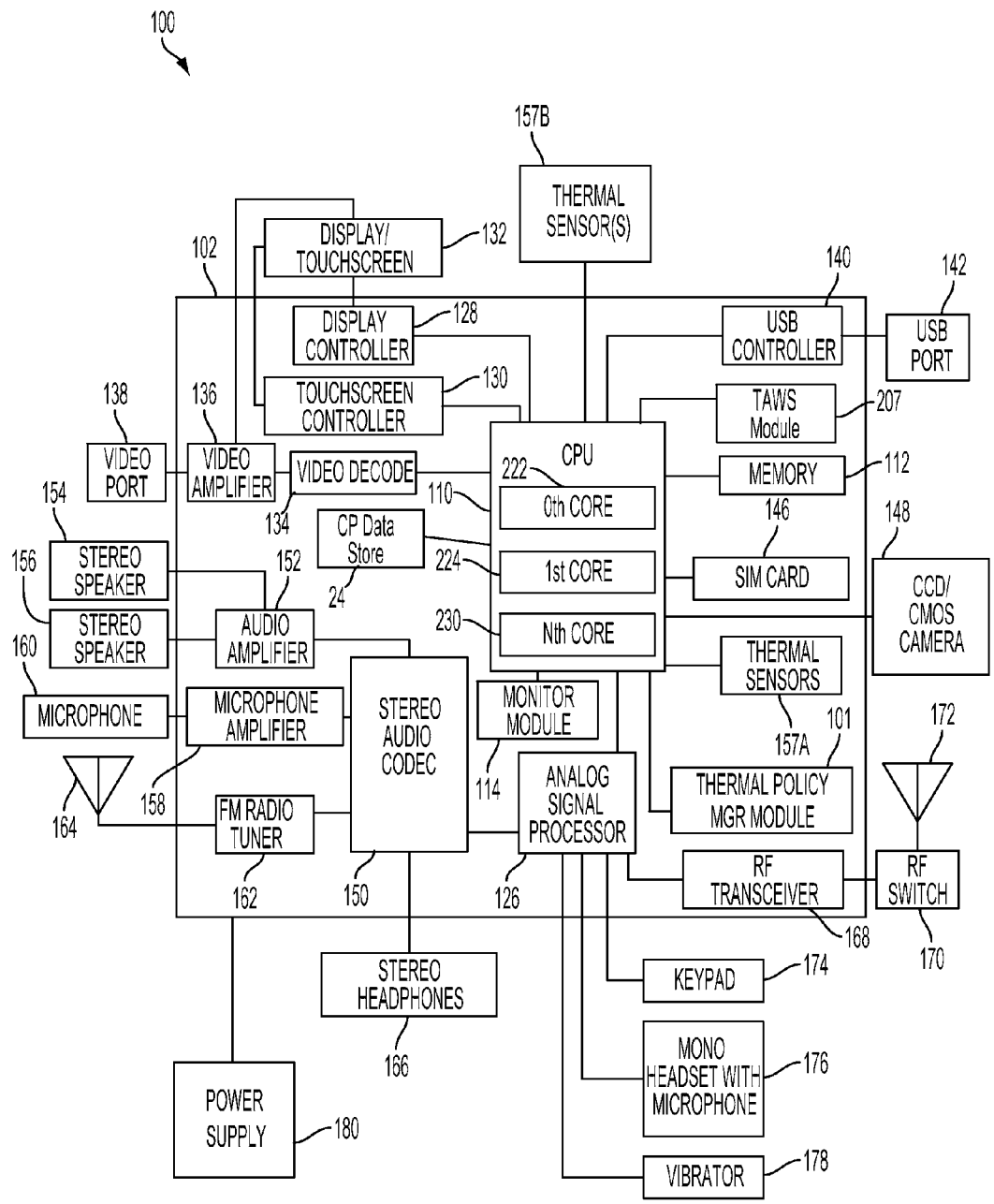
FIG. 4 is a functional block diagram illustrating an exemplary embodiment of the PCD of FIG. 3.

FIG. 4 is a functional block diagram of an exemplary, non-limiting aspect of a PCD 100 in the form of a wireless telephone for implementing methods and systems for monitoring thermal conditions, comparing performance curves and scheduling workloads to processing components best positioned for efficient processing. As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different efficiencies under similar operating conditions.

In general, the TPM module(s) 101 may be responsible for monitoring and applying thermal policies that include one or more thermal mitigation techniques. Application of the thermal mitigation techniques may help a PCD 100 manage thermal conditions and/or thermal loads and avoid experiencing adverse thermal conditions, such as, for example, reaching critical temperatures, while maintaining a high level of functionality. The thermally aware workload scheduling module(s) 207 may receive the same or similar temperature data as the TPM module(s) 101, yet leverage the temperature data to query performance curves associated with the cores 222, 224, 230, perform a comparative analysis of the processing core performance curves and schedule blocks of code to the cores 222, 224, 230 that will most efficiently process the workload.

FIG. 4 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the TPM module 101 and/or TAWS module 207. The TPM module 101 may work with the monitor module 114 to identify thermal transition points that may warrant application of one or more thermal mitigation techniques that include workload allocation and/or reallocation. The TAWS module 207 may work with the monitor module 114 to query processor performance curves related to the temperatures monitored by the monitor module 114, compare the curves and select the most efficient processor available and capable of processing a block of code.

As illustrated in FIG. 4, a display controller 128 and a touch screen controller 130 are coupled to the digital signal processor 110. A touch screen display 132 external to the on-chip system 102 is coupled to the display controller 128 and the touch screen controller 130.

PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touch screen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 5A). However, other types of thermal sensors 157 may be employed without departing from the scope of the invention.

The thermal sensors 157, in addition to being controlled and monitored by an ADC controller 103, may also be controlled and monitored by one or more TPM module(s) 101 and/or TAWS module(s) 207. The TPM module(s) 101 and/or TAWS module(s) 207 may comprise software which is executed by the CPU 110. However, the TPM module(s) 101 and/or TAWS module(s) 207 may also be formed from hardware and/or firmware without departing from the scope of the invention. The TPM module(s) 101 may be responsible for monitoring and applying thermal policies that include one or more thermal mitigation techniques that may help a PCD 100 avoid critical temperatures while maintaining a high level of functionality. The TAWS module(s) 207 may be responsible for querying processor performance curves and, based on an analysis of those curves, assigning blocks of code to processors most capable of efficiently processing the code at the time of workload allocation.

Returning to FIG. 4, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more TPM module(s) 101 and/or TAWS module(s) 207. These instructions that form the TPM module(s) 101 and/or TAWS module(s) 207 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 5A:
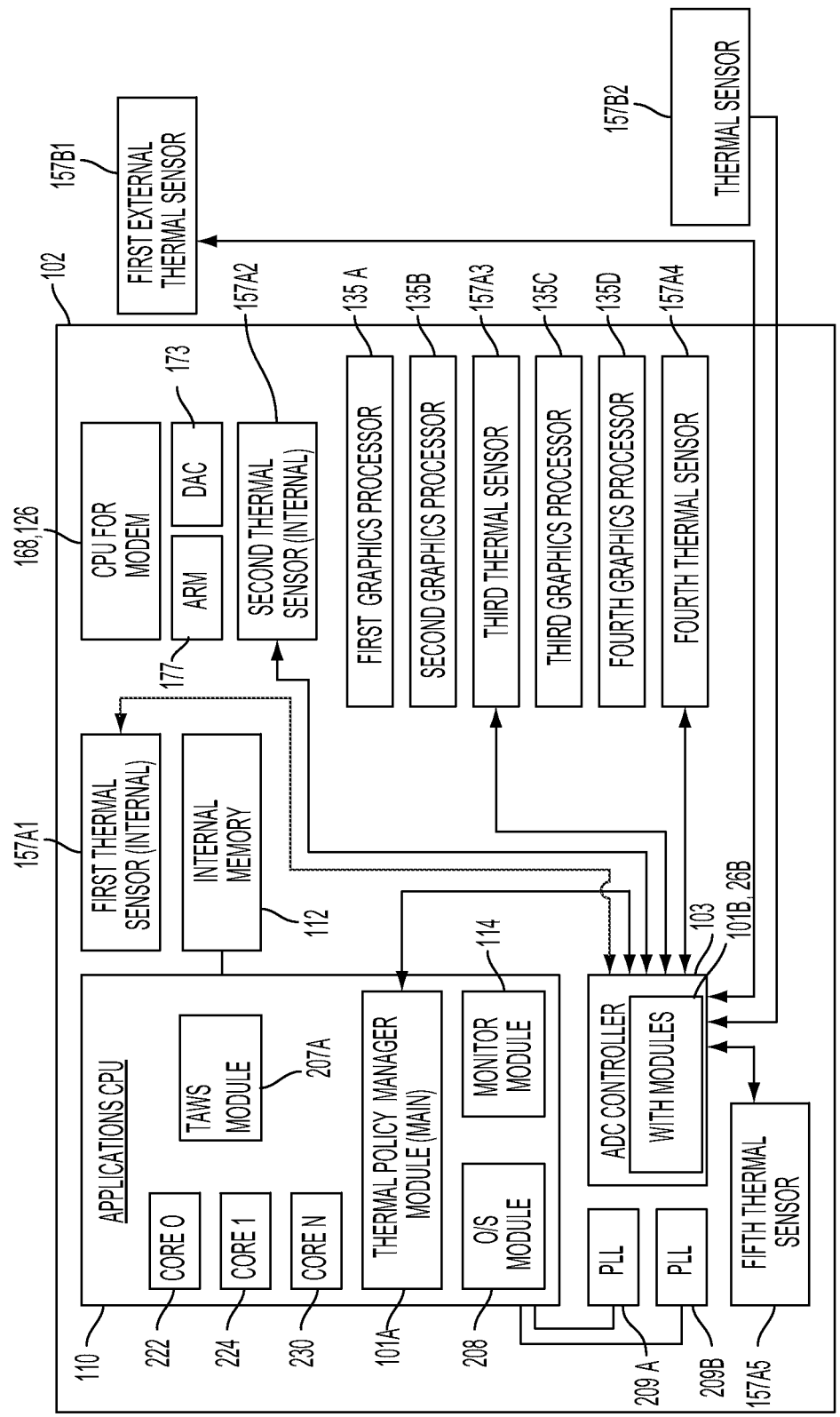
FIG. 5A is a functional block diagram illustrating an exemplary spatial arrangement of hardware for the chip illustrated in FIG. 4.

FIG. 5A is a functional block diagram illustrating an exemplary spatial arrangement of hardware for the chip 102 illustrated in FIG. 4. According to this exemplary embodiment, the applications CPU 110 is positioned on the far left side region of the chip 102 while the modem CPU 168, 126 is positioned on a far right side region of the chip 102. The applications CPU 110 may comprise a heterogeneous multi-core processor that includes a zeroth core 222, a first core 224, and an Nth core 230. The applications CPU 110 may be executing a TPM module 101A and/or TAWS module(s) 207a (when embodied in software) or it may include a TPM module 101A and/or TAWS module(s) 207A (when embodied in hardware). The application CPU 110 is further illustrated to include operating system ("O/S") module 208 and a monitor module 114. Further details about the monitor module 114 will be described below in connection with FIG. 5B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B and/or TAWS module(s) 207B that works in conjunction with the main modules 101A, 207A of the applications CPU 110.

The thermal policy manager 101B of the ADC controller 103 may be responsible for monitoring and tracking multiple thermal sensors 157 that may be provided "on-chip" 102 and "off-chip" 102. The on-chip or internal thermal sensors 157A may be positioned at various locations.

As a non-limiting example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 5A may be provided without departing from the scope of the invention. FIG. 5A illustrates one exemplary spatial arrangement and how the main TPM and TAW modules 101A, 207A and ADC controller 103 with its TPM and TAW modules 101B, 207B may recognize thermal conditions that are a function of the exemplary spatial arrangement illustrated in FIG. 5A, compare performance curves and allocate workloads to manage thermal conditions.

Figure 5B:
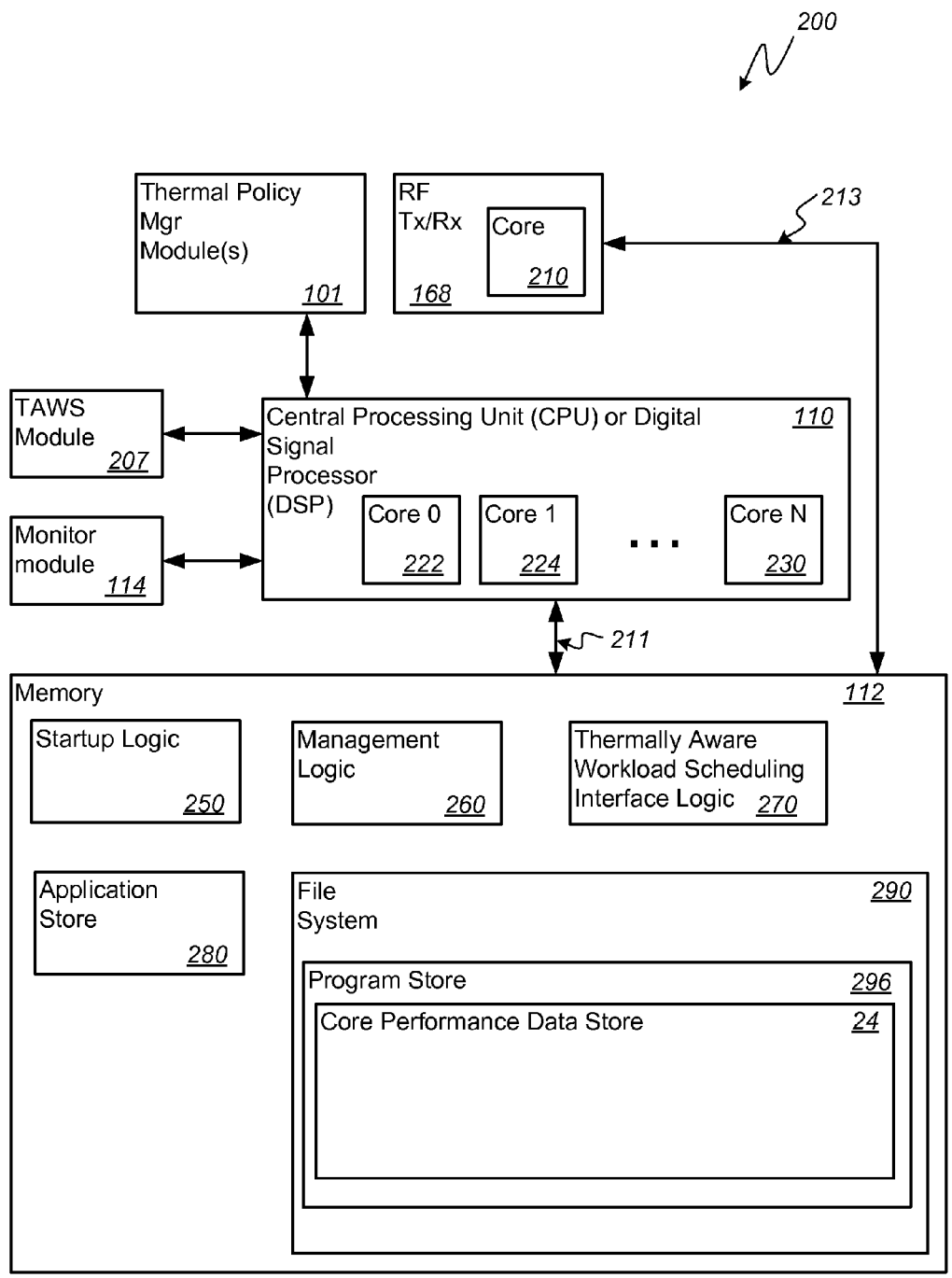
FIG. 5B is a schematic diagram illustrating an exemplary software architecture of the PCD of FIG. 4 for supporting thermally aware workload scheduling based on comparative analysis of processor performance curves.

FIG. 5B is a schematic diagram illustrating an exemplary software architecture 200 of the PCD 100 of FIG. 4 and FIG. 5A for supporting identification of thermal conditions and application of algorithms that leverage comparative analysis of processing core performance curves to select processors for workload allocation. Any number of algorithms may form or be part of at least one thermal mitigation technique that may be applied by the thermal policy manager 101 when certain thermal conditions are met and performance curves analyzed. Similarly, any number of algorithms may form or be part of at least one thermally aware scheduling algorithm that may be applied by the TAWS module 207 when certain thermal conditions exist and associated performance curves analyzed.

As illustrated in FIG. 5B, the CPU or digital signal processor 110 is coupled to the memory 112 via a bus 211. The CPU 110, as noted above, is a multiple-core, heterogeneous processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program and, as part of a heterogeneous core, may provide differing levels of performance under similar thermal operating conditions. Alternatively, one or more applications or programs can be distributed for processing across two or more of the available heterogeneous cores.

The CPU 110 may receive commands from the TPM module(s) 101 that may comprise software and/or hardware. If embodied as software, the TPM module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 5B, it should be noted that one or more of startup logic 250, management logic 260, thermally aware workload scheduling interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the thermally aware workload scheduling interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

The startup logic 250 includes one or more executable instructions for selectively identifying, loading, and executing a select program for thermally aware comparative analysis and selection of one or more of the available cores such as the first core 222, the second core 224 through to the $N^{th}$ core 230.

The management logic 260 includes one or more executable instructions for terminating a thermally aware performance curve analysis program, as well as selectively identifying, loading, and executing a more suitable replacement program for thermally aware comparative analysis, selection and workload allocation to one or more of the available cores. The management logic 260 is arranged to perform these functions at run time or while the PCD 100 is powered and in use by an operator of the device. A replacement program can be found in the program store 296 of the embedded file system 290.

The replacement program, when executed by one or more of the core processors in the digital signal processor or the core 210 in the RF transceiver 168, may operate in accordance with one or more signals provided by the TPM module 101, TAW module 207 and monitor module 114. In this regard, the modules 114 may provide one or more indicators of events, processes, applications, resource status conditions, elapsed time, temperature, etc in response to control signals originating from the TPM 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged core performance data store 24. In this regard, the file system 290 may include a reserved section of its total file system capacity for the storage of information associated with the performance curves of the various cores 222, 224, 226, 228 at various operating temperatures.

Figure 6:
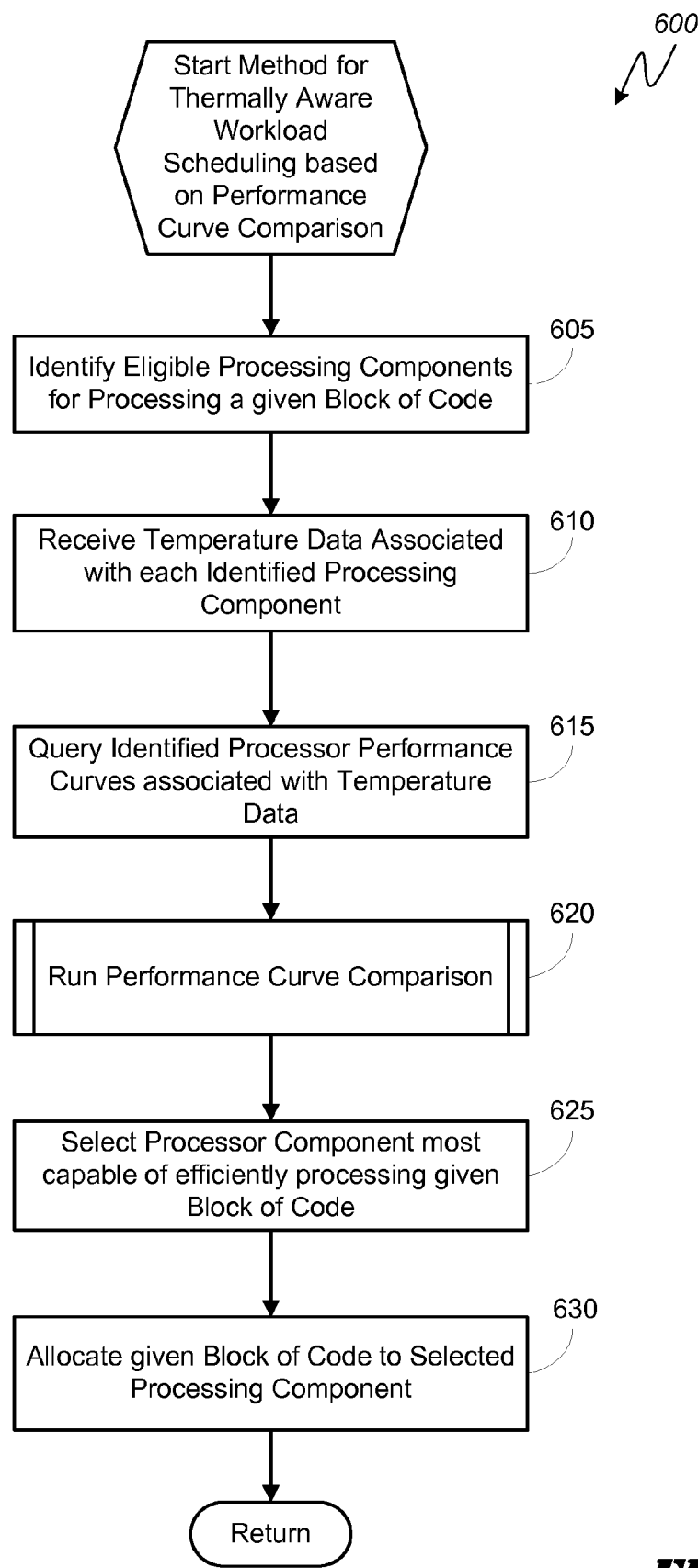
FIG. 6 is a logical flowchart illustrating an embodiment of a method for thermally aware workload scheduling across heterogeneous processing components based on comparative analysis of processor performance curves.

FIG. 6 is a logical flowchart illustrating an embodiment of a method 600 for thermally aware workload scheduling across heterogeneous processing components in a PCD 100 based on comparative analysis of processor performance curves. In the FIG. 6 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocation data received from the TAWS module 207 and compiled into empirical performance curves. The empirical performance curves may be stored in the CP data store 24 and leveraged by a thermally aware workload scheduling algorithm.

Beginning at block 605, the TAWS module 207 identifies two or more processing components within the heterogeneous, multi-processor SoC that are capable of processing a block of code ready to be processed. At block 610, the TAWS module 207 may request and receive from the monitor module 114 the operating temperatures of the two or more processing components such as, for example, cores 222, 224, 226, 228. At block 615, the operating temperatures of the various cores 222, 224, 226, 228 can be used by the TAWS module 207 to query the CP data store 24 for applicable performance curves for each of the cores and, at sub-method 620 the curves can be compared to determine which may be most efficient at processing the block of code. As described above, based on the transition points shared by the compared curves and the current workloads for each core being compared, the TAWS module 207 may select at block 625 which of the exemplary processing components 222, 224, 226, 228 is capable of most efficiently processing the block of code. Once the most efficient of the eligible processing components is identified, the block of code is allocated to the selected processing component at block 630 and the method returns to block 605 for the next block of code ready for scheduling.

Figure 7:
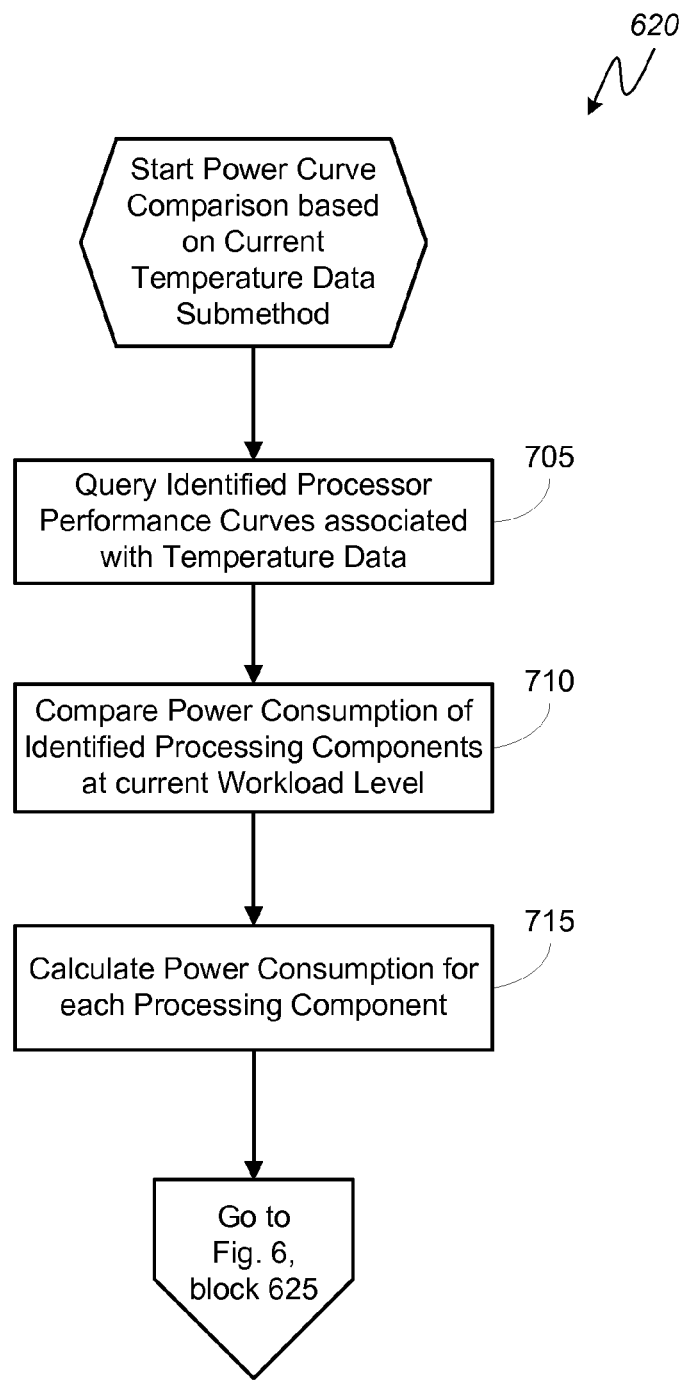
FIG. 7 is a logical flowchart illustrating an exemplary sub-method or subroutine for comparative analysis of processor performance curves.

FIG. 7 is a logical flowchart illustrating an exemplary sub-method 620 for comparative analysis of processor performance curves where the power curves selected for comparison are associated with the current operating temperatures of the eligible processing components. At block 705, the performance curves are queried from the CP data store 24 based on the temperature measurements associated with each of the processing components and previously provided to the TAWS module 207 at block 610. Once the appropriate performance curves are identified for each of the processing components, such as cores 222, 224, 226, 228 in the heterogeneous multi-core processor 110, at block 710 the curves can be compared to identify which processing component may be operating the most efficiently at the time of comparison. Notably, transition points of the compared curves, as described above, may represent a threshold by which the TAWS module 207 may select one processing component over another. However, it is envisioned that not all compared performance curves will necessarily "crossover" such that a transition point exists. In such a case, one of ordinary skill in the art will recognize that the performance curve of one processing component may indicate that the processing component is presently running more efficiently than its counterpart at any, or most, workload levels.

Returning to the FIG. 7 sub-method, because the current workload levels for each of the cores can be mapped on the selected curves, the TAWS module 207 can determine the present power consumption rate for each of the cores. Subsequently, at block 715 the power consumption of each of the compared processing components can be calculated and the processor with the lowest current power consumption identified as the most efficient processing component available for additional workload allocation.

Figure 8:
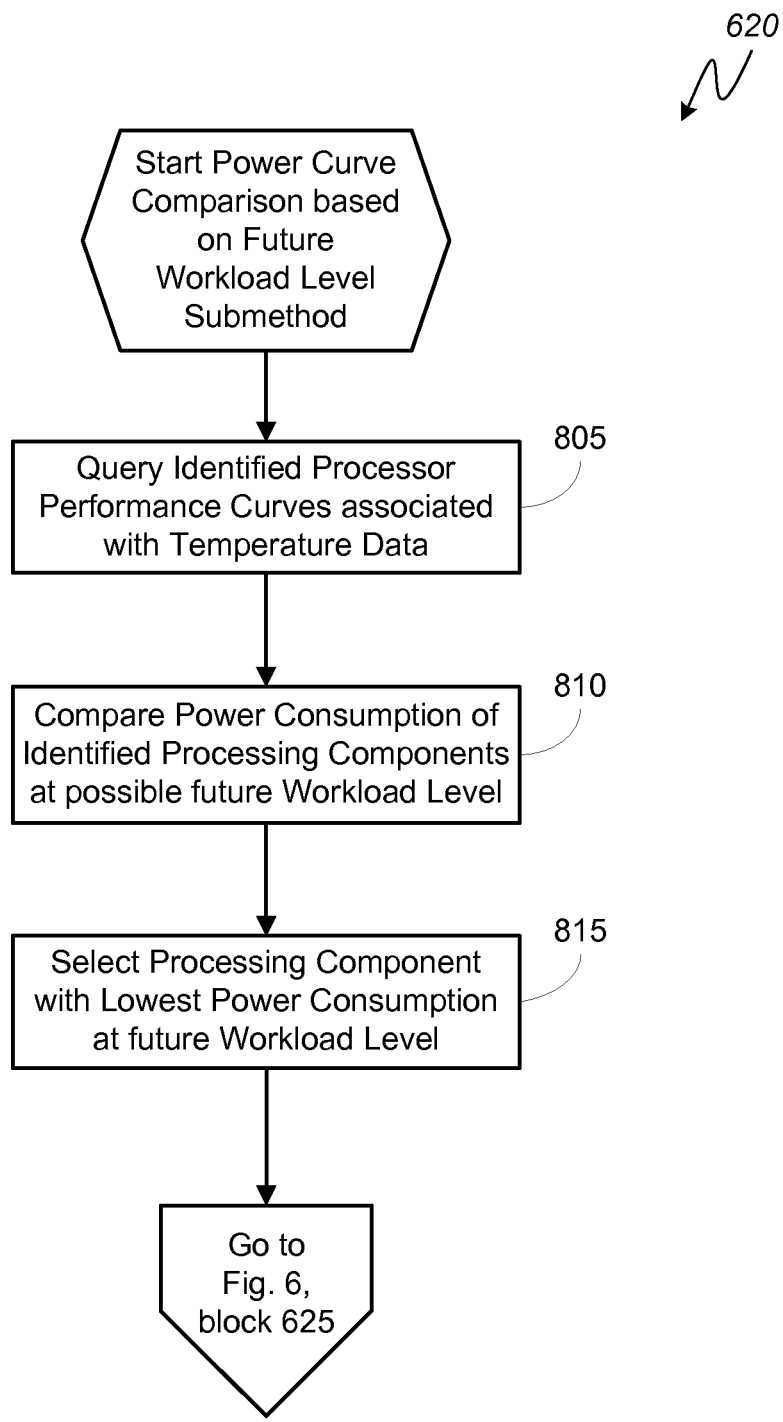
FIG. 8 is a logical flowchart illustrating an exemplary sub-method or subroutine for comparative analysis of processor performance curves.

FIG. 8 is a logical flowchart illustrating an exemplary sub-method 620 for comparative analysis of processor performance curves where the power curves selected for comparison are associated with the current operating temperatures of the eligible processing components. At block 805, the performance curves are queried from the CP data store 24 based on the temperature measurements associated with each of the processing components and previously provided to the TAWS module 207 at block 610. Once the appropriate performance curves are identified for each of the processing components, such as cores 222, 224, 226, 228 in the heterogeneous multi-core processor 110, at block 810 the curves can be compared to identify which processing component may offer the best processing efficiency if allocated the block of code. That is, the additional workload burden represented by the block of code can be added to the existing workloads being processed by the identified processing components. The predicted future workloads can then be mapped to the performance curves at block 810 and the predicted future power consumptions of each processing component compared. At blocks 815 and 625, the processing component with the lowest predicted power consumption at the future workload level may be selected.

Figure 9:
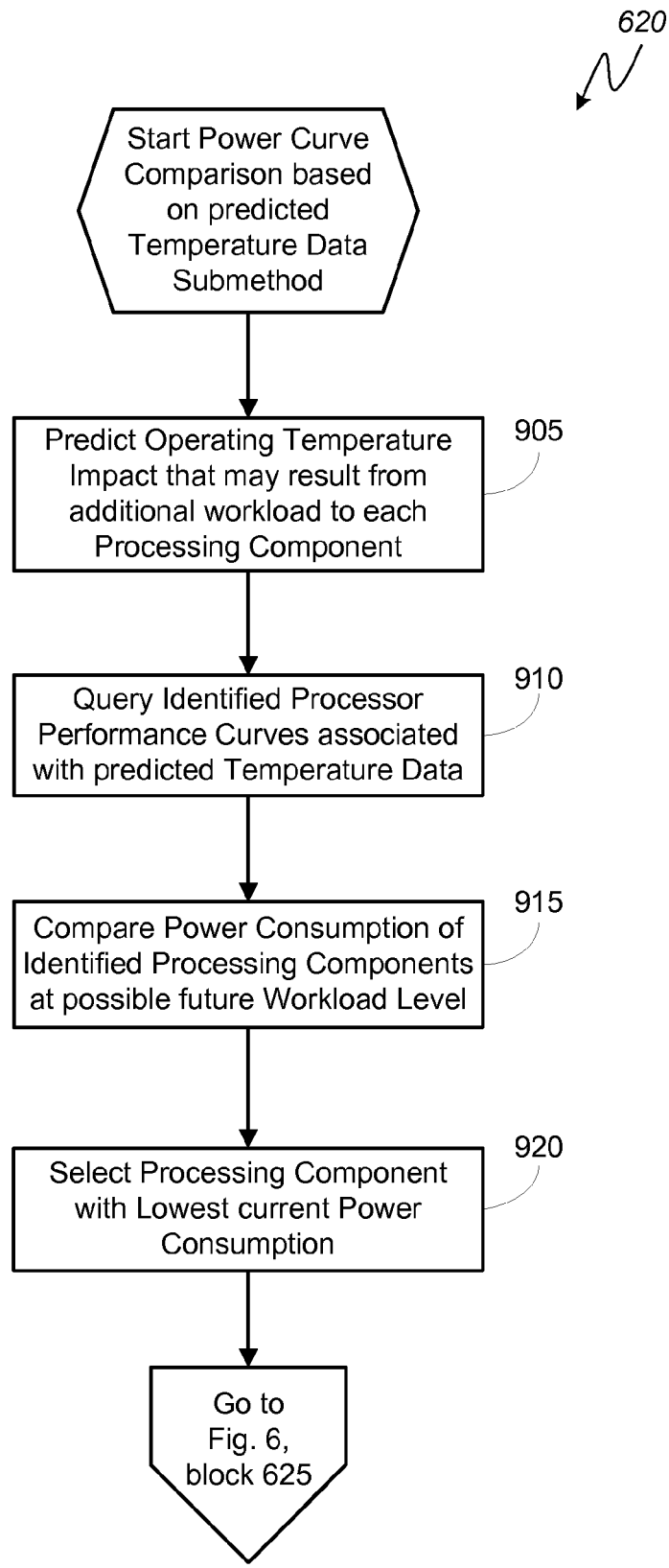
FIG. 9 is a logical flowchart illustrating an exemplary sub-method or subroutine for comparative analysis of processor performance curves.

FIG. 9 is a logical flowchart illustrating an exemplary sub-method 620 for comparative analysis of processor performance curves where the power curves selected for comparison are associated with predicted operating temperatures of the eligible processing components. As described above, additional workload burdens may cause a processing component to consume more power, thus increasing its power leakage rate and generating additional thermal energy. As one of ordinary skill in the art would understand, dissipation of the generated thermal energy may cause an increase in the operating temperature of a given processing component and render it less efficient than an alternative processing component.

At block 905, for each of the identified processing components, the impact on operating temperature that may result from the addition of the workload is calculated. Based on the predicted operating temperatures, at block 910 the performance curves are queried from the CP data store 24. Once the appropriate performance curves are identified for each of the processing components, such as cores 222, 224, 226, 228 in the heterogeneous multi-core processor 110, at block 915 the curves can be compared to identify which processing component may offer the best processing efficiency if allocated the block of code. That is, the additional workload burden represented by the block of code can be added to the existing workloads being processed by the identified processing components and mapped to the queried performance curves. Subsequently, the predicted future power consumptions of each processing component can be compared. At blocks 920 and 625, the processing component with the lowest predicted power consumption at the future workload level and operating temperature may be selected.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for scheduling workloads in a portable computing device having a heterogeneous, multi-processor system on a chip ("SoC"), the method comprising:
   monitoring temperature readings uniquely associated with each of a plurality of individual processing components in the heterogeneous, multi-processor SoC;
   receiving a block of code to be processed by one of the plurality of individual processing components;
   identifying two or more of the plurality of individual processing components that are eligible to process the block of code;
   based on the temperature reading uniquely associated with each of the two or more eligible processing components, querying for each processing component a performance curve from a plurality of performance curves uniquely associated with each processing component from a database of performance curves, wherein the performance curve represents the relationship between power consumption and workload processing capability for a given individual processing component when operating at a given temperature associated with the temperature reading;
   comparing the performance curves for each eligible processing component to identify a more efficient processing component based on a determination of one or more transition points, wherein a transition point is a point at which two of the performance curves intersect and wherein the performance curve of the more efficient processing component indicates that relative to a determined transition point the more efficient processing component will consume less power than other eligible processing components to process the block of code; and
   scheduling the block of code to the identified more efficient processing component.

2. The method of claim 1, wherein the more efficient processing component is the processing component consuming the least amount of power at its present workload.

3. The method of claim 1, wherein the more efficient processing component is the processing component calculated to consume the least amount of power at a future workload that would include the block of code.

4. The method of claim 1, wherein the temperature reading uniquely associated with each of the two or more eligible processing components is indicative of a predicted rise in the temperature readings for each of the eligible processing components attributable to a future workload that would include the block of code; and
   wherein the queried performance curves for each eligible processing component is associated with the predicted rise in the temperature readings.

5. The method of claim 4, wherein the more efficient processing component is the processing component that would consume the least amount of power at its present workload.

6. The method of claim 4, wherein the more efficient processing component is the processing component that would consume the least amount of power at a future workload that would include the block of code.

7. A computer system for scheduling workloads in a portable computing device having a heterogeneous, multi-processor system on a chip ("SoC"), the system comprising:
   a monitor module configured to:
      monitor temperature readings uniquely associated with each of a plurality of individual processing components in the heterogeneous, multi-processor SoC; and
   a thermally aware workload scheduling module comprising a processor, the thermally aware workload scheduling module configured to:
      receive a block of code to be processed by one of the plurality of individual processing components;
      identify two or more of the plurality of individual processing components that are eligible to process the block of code;
      based on the temperature reading associated with each of the two or more eligible processing components, query a core performance store for a performance curve for each processing component from a plurality of performance curves uniquely associated with each processing component, wherein the performance curve represents the relationship between power consumption and workload processing capability for a given individual processing component when operating at a given temperature associated with the temperature reading;
      compare the performance curves for each eligible processing component to identify a more efficient processing component based on a determination of one or more transition points, wherein a transition point is a point at which two of the performance curves intersect and wherein the performance curve of the more efficient processing component indicates that relative to a determined transition point the more efficient processing component will consume less power than other eligible processing components to process the block of code; and schedule the block of code to the identified more efficient processing component.

8. The computer system of claim 7, wherein the more efficient processing component is the processing component consuming the least amount of power at its present workload.

9. The computer system of claim 7, wherein the more efficient processing component is the processing component calculated to consume the least amount of power at a future workload that would include the block of code.

10. The computer system of claim 7, wherein the temperature reading uniquely associated with each of the two or more eligible processing components is indicative of a predicted rise in the temperature readings for each of the eligible processing components attributable to a future workload that would include the block of code; and wherein the queried performance curves for each eligible processing component is associated with the predicted rise in temperature readings.

11. The computer system of claim 10, wherein the more efficient processing component is the processing component that would consume the least amount of power at its present workload.

12. The computer system of claim 10, wherein the more efficient processing component is the processing component that would consume the least amount of power at a future workload that would include the block of code.

13. A computer system for scheduling workloads in a portable computing device having a heterogeneous, multi-processor system on a chip ("SoC"), the system comprising:

means for monitoring temperature readings uniquely associated with each of a plurality of individual processing components in the heterogeneous, multi-processor SoC;

means for receiving a block of code to be processed by one of the plurality of individual processing components;

means for identifying two or more of the plurality of individual processing components that are eligible to process the block of code;

based on the temperature reading associated with each of the two or more eligible processing components, means for querying for each processing component a performance curve from a plurality of performance curves uniquely associated with each processing component from a database of performance curves, wherein the performance curve represents the relationship between power consumption and workload processing capability for a given individual processing component when operating at a given temperature associated with the temperature reading;

means for comparing the performance curves for each eligible processing component to identify a more efficient processing component based on a determination of one or more transition points, wherein a transition point is a point at which two of the performance curves intersect and wherein the performance curve of the more efficient processing component indicates that relative to a determined transition point the more efficient processing component will consume less power than other eligible processing components to process the block of code; and means for scheduling the block of code to the identified more efficient processing component.

14. The computer system of claim 13, wherein the more efficient processing component is the processing component consuming the least amount of power at its present workload.

15. The computer system of claim 13, wherein the more efficient processing component is the processing component calculated to consume the least amount of power at a future workload that would include the block of code.

16. The computer system of claim 13, wherein the temperature reading uniquely associated with each of the two or more eligible processing components is indicative of a predicted rise in the temperature readings for each of the eligible processing components attributable to a future workload that would include the block of code; and wherein the queried performance curves for each eligible processing component is associated with the predicted rise in temperature readings.

17. The computer system of claim 16, wherein the more efficient processing component is the processing component that would consume the least amount of power at its present workload.

18. The computer system of claim 16, wherein the more efficient processing component is the processing component that would consume the least amount of power at a future workload that would include the block of code.

19. A computer program product comprising a non-transitory computer usable medium having a computer readable program code embodied therein, said computer readable program code adapted to be executed to implement a method for scheduling workloads in a portable computing device having a heterogeneous, multi-processor system on a chip ("SoC"), said method comprising:

monitoring temperature readings uniquely associated with each of a plurality of individual processing components in the heterogeneous, multi-processor SoC;

receiving a block of code to be processed by one of the plurality of individual processing components;

identifying two or more of the plurality of individual processing components that are eligible to process the block of code;

based on the temperature reading associated with each of the two or more eligible processing components, querying for each processing component a performance curve from a plurality of performance curves uniquely associated with each processing component from a database of performance curves, wherein the performance curve represents the relationship between power consumption and workload processing capability for a given individual processing component when operating at a given temperature associated with the temperature reading;

comparing the performance curves for each eligible processing component to identify a more efficient processing component based on a determination of one or more transition points, wherein a transition point is a point at which two of the performance curves intersect and wherein the performance curve of the more efficient processing component indicates that relative to a determined transition point the more efficient processing component will consume less power than other eligible processing components to process the second block of code; and scheduling the block of code to the identified more efficient processing component.

20. The computer program product of claim 19, wherein the more efficient processing component is the processing component consuming the least amount of power at its present workload.

21. The computer program product of claim 19, wherein the more efficient processing component is the processing component calculated to consume the least amount of power at a future workload that would include the block of code.

22. The computer program product of claim 19, wherein the temperature reading uniquely associated with each of the two or more eligible processing components is indicative of a predicted rise in the temperature readings for each of the eligible processing components attributable to a future workload that would include the block of code; and wherein the queried performance curves for each eligible processing component is associated with the predicted rise in temperature readings.

23. The computer program product of claim 22, wherein the more efficient processing component is the processing component that would consume the least amount of power at its present workload.

24. The computer program product of claim 22, wherein the more efficient processing component is the processing component that would consume the least amount of power at a future workload that would include the block of code.

* * * * *